F. I. JOHNSON.
RESILIENT TIRE FOR VEHICLES.
APPLICATION FILED MAR. 29, 1916.
1,278,671.
Patented Sept. 10, 1918.
3 SHEETS—SHEET 1.
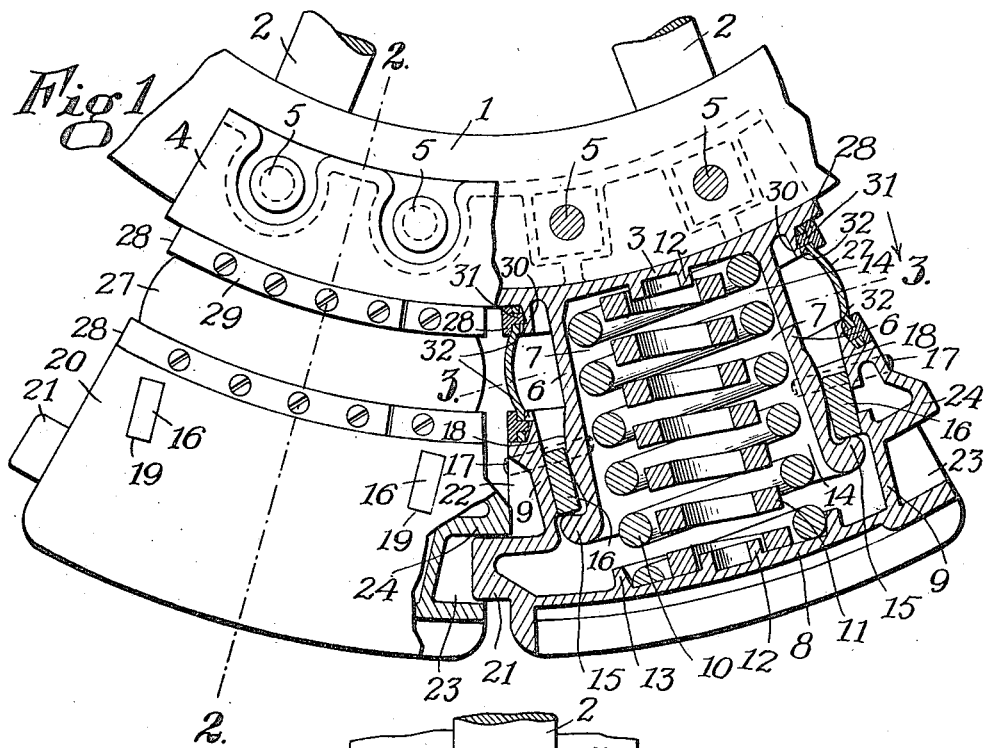
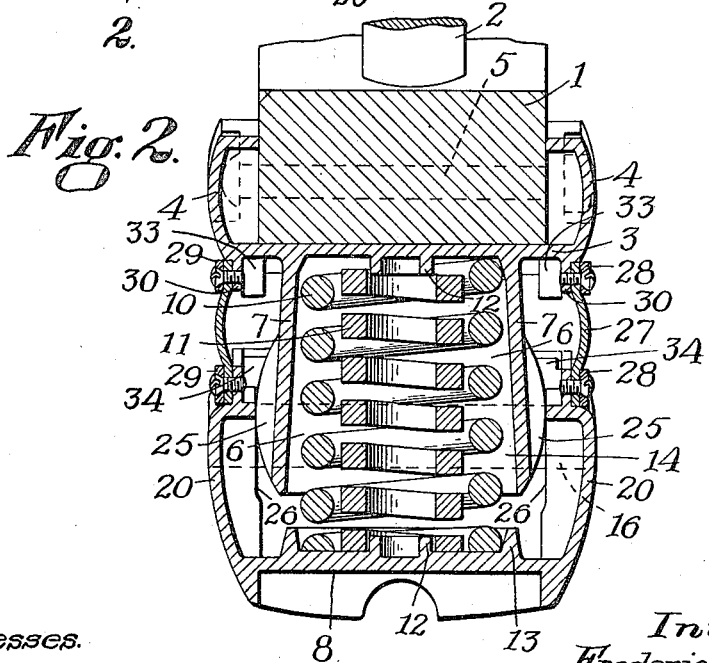
Witnesses.
R. D. Tobman.
Penelope Cumberbach.
Inventor
Frederic I. Johnson
By Geo. H. Kennedy Jr.
Attorney F. I. JOHNSON.
RESILIENT TIRE FOR VEHICLES.
APPLICATION FILED MAR. 29, 1916.
1,278,671.
Patented Sept. 10, 1918.
3 SHEETS—SHEET 2.
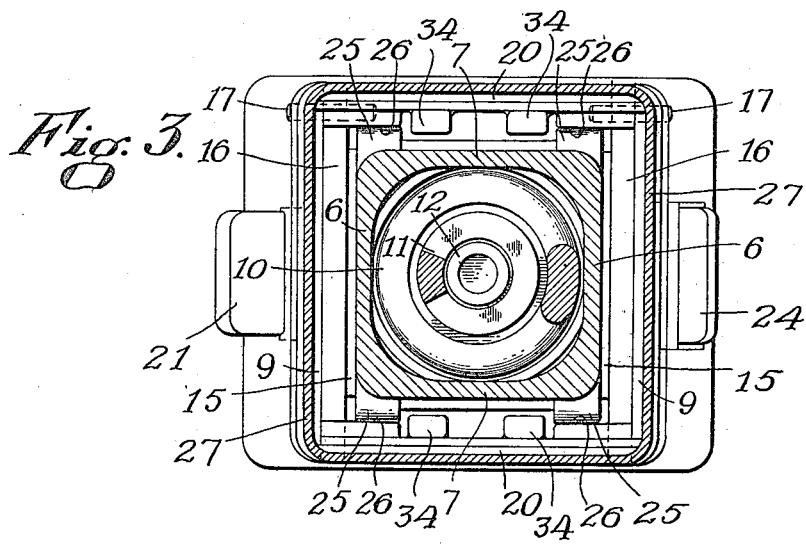
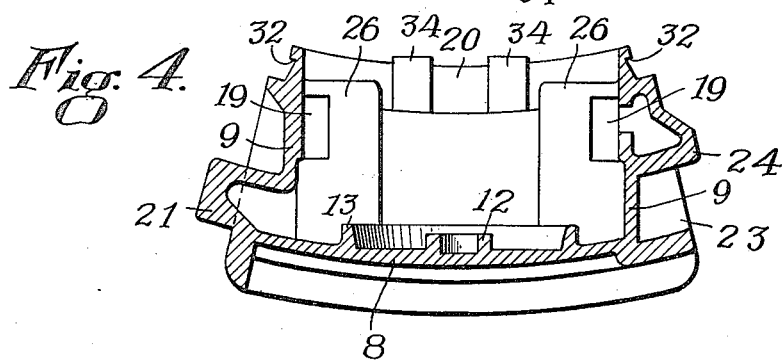
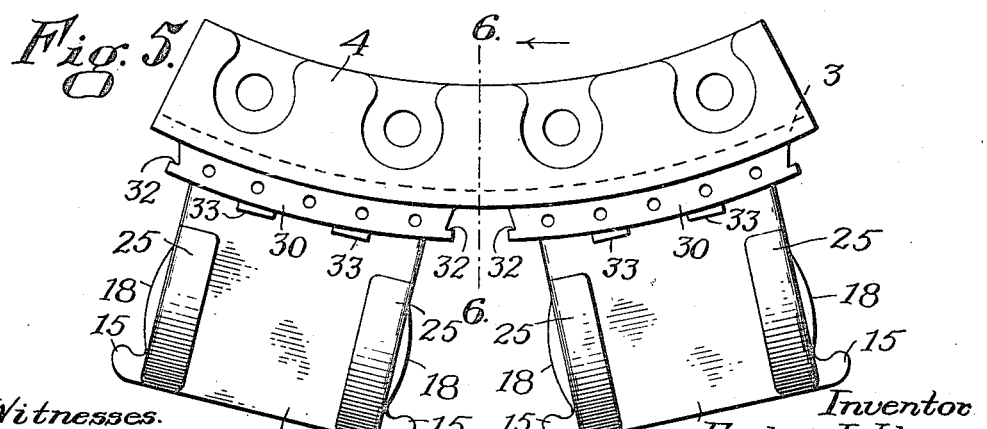
Witnesses.
R. D. Tolman.
Penelope Cumberbach.
Inventor
Frederic I. Johnson.
By Geo. H. Kennedy Jr.
Attorney

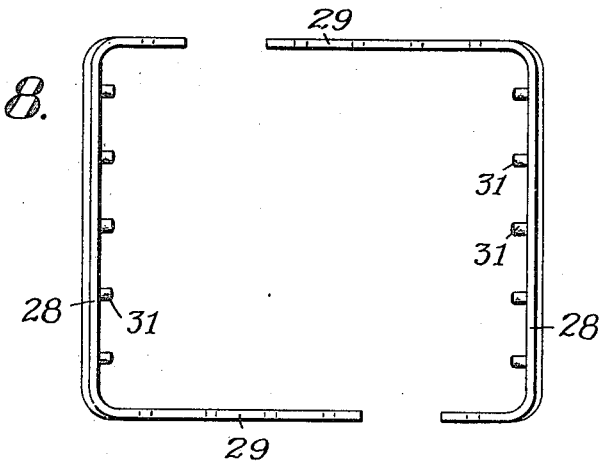
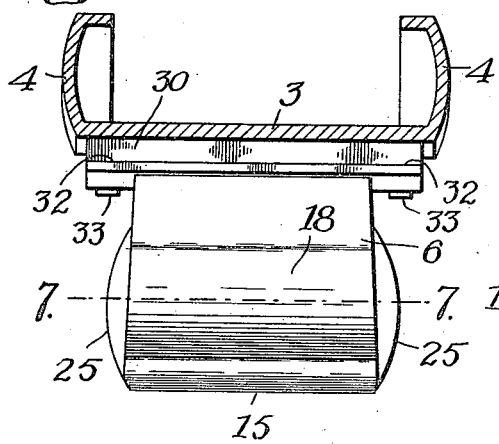
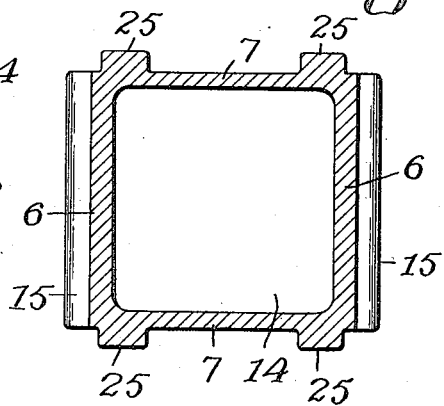

UNITED STATES PATENT OFFICE.

FREDERIC I. JOHNSON, OF FITCHBURG, MASSACHUSETTS, ASSIGNOR TO JOHNSON PNEU-METAL TIRE COMPANY, OF FITCHBURG, MASSACHUSETTS, A CORPORATION OF MASSACHUSETTS.

RESILIENT TIRE FOR VEHICLES.

1,278,671.  Specification of Letters Patent.  Patented Sept. 10, 1918.

Application filed March 29, 1916. Serial No. 87,597.

*To all whom it may concern:*

Be it known that I, FREDERIC I. JOHNSON, a citizen of the United States, residing at Fitchburg, in the county of Worcester and Commonwealth of Massachusetts, have invented a new and useful Improvement in Resilient Tires for Vehicles, of which the following is a specification, accompanied by drawings forming a part of the same.

My present invention relates to that class of resilient wheel tires which comprise a series of separated sections arranged concentrically around the rim of the wheel, and comprising a series of tread plates with springs interposed between the tread plates and the rim of the wheel. The type of resilient wheel tires to which my present improvement belongs are adapted for use upon vehicles required to carry heavy loads, and to take the place of the pneumatic tires in common use.

The objects of my present invention are to provide a construction by which the expense of the tire is reduced and its durability increased, and further to provide improved means by which the rotative movement of the wheel may be imparted to the tread plate of each section as the tread plate is brought into contact with the ground and made to support the weight of the load. Another object of my present invention is to provide means by which the direction of movement of the wheel may be varied, in the operation of steering the vehicle, without cramping the action of the movable parts of the tire and thereby reducing the resiliency of the sections. The above objects, among others, I accomplish by means of the construction hereinafter described and illustrated in the accompanying drawings, in which—

Figure 1 represents a side view of a portion of a wheel rim carrying two sections of my improved resilient tire, with one of said sections shown in central sectional view.

Fig. 2 is a transverse sectional view of the wheel rim and one of the resilient sections carried thereby, the section being taken in a plane at right angles to the section shown in Fig. 1, and on the plane of the broken line 2—2, Fig. 1.

Fig. 3 is a plan view of one of the tire sections shown in sectional view on the plane of the broken line 3—3, Fig. 1.

Fig. 4 is a side view of one of the tread plates shown in central sectional view.

Fig. 5 is a side elevation of two of the rim plates.

Fig. 6 is an elevation of one of the rim plates, a portion being shown in sectional view on the plane of the broken line 6—6, Fig. 5.

Fig. 7 is a plan view of one of the rim plates shown in section on the plane of the broken line 7—7, Fig. 6.

Fig. 8 is a detached view of the sectional metal band for supporting the flexible band by which the space between the rim plate and tread plate is closed.

Similar reference characters refer to similar parts in the different figures.

Referring to the drawings, 1 denotes a portion of a wheel rim mounted upon the ends of spokes 2, 2. Supported upon the periphery of the wheel rim are a series of rim plates 3, provided with flanges 4 which inclose the sides of the wheel rim to which they are attached by bolts 5. Upon the rim plates 3 are mounted the resilient tire sections. For convenience of construction two rim plates are formed in a single piece, each supporting a section of the tire.

Projecting outwardly from the rim plate 3 are flanges 6, 6, Fig. 1, placed transversely to the plane of rotation of the wheel, and having their ends rigidly connected by webs 7, 7, Fig. 2. Each of the tire sections is provided with a tread plate 8 concentric with the rim of the wheel, and provided with flanges 9, 9, extending inwardly toward the center of the wheel transversely to its plane of rotation and outside the rim plate flanges 6, 6. Between the rim plates 3 and the tread plates 8 I place coiled springs 10 and 11, preferably two in number. The inner spring 11 is held in place by bosses 12, 12, entering its end coils, and the outer spring 10 is held concentric therewith by the flanges 6, 6, and the annular boss 13. The flanges 6 and the connecting webs 7 inclose a chamber 14 in which the coiled springs 10 and 11 are contained. The free edges of the flanges 6, 6, are provided with hooks 15, 15, which engage the edges of removable keys 16, 16, held against the flanges 9, 9, and kept from longitudinal movement by means of pins 17, 17, held in the flanges 9, 9, and entering notches in the edges of the keys 16. The engagement of the hooks 15 with the keys 16 limit the separation of the tread plate from the rim plate under the pressure of the springs 10 and 11.

The inner surfaces of the keys 16 contact with the inner surfaces of the flanges 9, 9, and the outer surfaces of the flanges 6, 6, and the rotative movement of the wheel is thereby communicated to the tread plate 8 through flanges 6, keys 16 and flanges 9. As each of the tire sections approach and leave the ground a rocking motion is transmitted to the tread plates and to facilitate this movement over the contacting surfaces of the flanges 6 I make the outer surfaces of the flanges 6, 6 convex, as shown at 18. In order to resist the strain brought upon the flanges 6, 6, I form a rigid connection between the ends of the flanges 6, 6, by means of the webs 7, 7, said flanges and webs forming a driving element of great strength and rigidity. The flanges 9, 9, of the tread plate are rigidly connected at their ends by webs 20, 20, rendering that member of the tread plate to which the rotative movement of the wheel is imparted, extremely rigid. The keys 16, 16, pass through rectangular holes 19 in the webs 20, 20, and being held from longitudinal movement at their ends the central portions of the keys are free to contact with the convex surface 18 of the rim plate flanges and to bear solidly against the inner surfaces of the flanges 9, 9.

One end of the tread plate is provided with a tongue 21 and a recess 22, and the opposite end of the tread plate is provided with a recess 23 and a projection 24. When the tire is assembled the tongue 21 extends into the recess 23 of the adjacent tread plate and the projection 24 extends into the recess 22 of the opposing tread plate, thereby increasing the overlapping surfaces between the tongue 21 and the projection 24. The interlocking of the tread plates allows each of the tread plates to resist any twisting movement of an adjacent tread plate, and it also causes the compression of either end of the tread plates to be communicated to the adjacent tread plate. A sidewise rocking movement is frequently imparted to the tread plate due to the unevenness of the ground or to the movement of one edge of the tread plate over a stone or other obstacle. In order to facilitate this sidewise rocking movement without any lost motion I provide convex ribs 25 upon the outer sides of the web 7 which contact with the plane surfaces 26 upon the inner side of the webs 20.

The space between the rim plate and the flanges of the tread plate are closed by a flexible band 27, the opposite edges of which are covered by metal bands 28, 28. The plates 28 are made in two sections which, when brought together, form a rectangular inclosure, as represented in Fig. 8. The outer sides 29 are attached by screws to flanges 30 on the rim plate and to the webs 20 of the tread plate. Those portions of the metal band 28 extending between the separated sections of the tire are provided with internal studs 31 which extend through holes in the flexible band 27 and overlap shoulders 32 on the flanges 30 of the rim plate and the flanges 9 of the tread plate, respectively.

The rim plate is provided with unyielding stops 33, Fig. 5, which oppose similar unyielding stops 34, Figs. 3 and 4, on the tread plate. The tread plate is normally separated from the rim of the wheel by the pressure of the springs 10 and 11, until the hooks 15, on the flanges 6 engage the edges of the keys 16, 16, as shown in Fig. 1. When the tread plate is in this position the distance between the stops 33 and 34 is less than the sum of the spaces between the coils of the springs 10, and also less than the sum of the spaces between the coils of the spring 11. The approach of the tread plate toward the rim of the wheel is therefore checked before the coils of either of the springs 10 and 11 have been brought into contact. Only a portion of the pressure of which the springs are capable is brought into action, causing the elastic life of the springs to be greatly extended.

I am aware that elastic buffers have been employed which are brought into contact by the compression of springs, also that stops have been proposed to limit the compression of coiled springs, placed concentrically within the coil of the spring. I employ two pairs of spaced stops on each rim plate and each tread plate, placed outside of and on opposite sides of the springs, whereby the stops not only prevent the too great compression of the springs, but they also prevent the too great distortion of the springs from their axial lines due to the rocking of the tread plates.

I claim,

1. A resilient wheel tire, comprising a rim plate, a tread plate, an interposed spring, a pair of outwardly projecting flanges carried by the rim plate transversely to the plane of rotation of the wheel, a pair of inwardly projecting flanges carried by the tread plate and inclosing said first named flanges, and removable keys rigidly supported in contact with the inner surface of said tread plate flanges, and opposing the outer surfaces of the rim plate flanges, whereby the rotative movement of the wheel is imparted to the tread plate.

2. A resilient wheel tire, comprising a rim plate, a tread plate, an interposed spring, a pair of flanges extending inwardly from said tread plate and disposed transversely to the plane of rotation of the wheel, a pair of flanges extending outwardly from the rim plate inside of and parallel to said pair of tread plate flanges and provided with convex surfaces opposing the inner surfaces of said tread plate flanges, whereby the rotative movement of the wheel is imparted to the tread plate and permitting a rocking movement of the tread plate as the wheel revolves.

3. A resilient wheel tire, comprising a rim plate, a tread plate, an interposed spring, a pair of flanges extending inwardly from said tread plate and disposed transversely to the plane of rotation of the wheel, rigid connections between the ends of said flanges, a pair of flanges extending outwardly from the rim plate and interior to the first mentioned pair of flanges, rigid connections between the ends of said interior flanges, said interior flanges being provided with convex contacting surfaces, whereby the rotative movement of the wheel is communicated to the tread plate and permitting a rocking movement of the tread plate as the wheel revolves.

4. A resilient wheel tire, comprising a rim plate, a tread plate, an interposed spring, a pair of flanges extending outwardly from said rim plate and provided at their free edges with outwardly projecting hooks, a pair of flanges extending inwardly from said tread plate and exterior to said first mentioned pair of flanges, webs uniting the ends of said tread plate flanges, removable keys rigidly held in said webs and engaging said hooks to limit the separation of the rim plate and tread plate.

5. A resilient wheel tire, comprising a rim plate, a tread plate, an interposed spring, a pair of flanges carried by said rim plate, a pair of flanges carried by said tread plate exterior to said rim plate flanges, said pairs of flanges being located transversely to the plane of rotation of the wheel, webs connecting the ends of said pairs of flanges and having opposing contacting surfaces, by which the deflection of the movement of the wheel from a straight line will be imparted to the tread plate.

6. A resilient wheel tire, comprising a rim plate, a tread plate, an interposed spring, flanges extending outwardly from said rim plate located transversely to the plane of rotation of the wheel, webs connecting the ends of said flanges provided with exterior convex contact surfaces, flanges extending inwardly from said tread plate exterior to said rim plate flanges, webs connecting the ends of said tread plate flanges provided with interior contact surfaces opposing said convex contact surfaces.

7. A resilient wheel tire, comprising a series of rim plates, a series of separated tread plates, springs interposed between the rim plates and tread plates, means for limiting the separation of said plates, one end of each tread plate having a recess and a projection and the opposite end having a recess for receiving the projection on the adjacent tread plate, and a tongue entering the recess of the adjacent tread plate and in contact with the outer and inner walls of said recess.

8. In a resilient wheel tire, comprising a rim plate, a tread plate, and an interposed coiled spring, a pair of spaced unyielding stops projecting from said rim plate on opposite sides of said coiled spring, and an opposing pair of stops projecting from said tread plate on each side of said spring, with the space between the ends of said stops less than the aggregate spaces between the coils of said spring.

9. In a resilient wheel tire, comprising a rim plate and a tread plate with a space between them, a flexible band closing said space, metal bands made in sections for covering the edges of said flexible band, and provided with a series of internal projecting studs engaging said flexible band, and projecting shoulders on said rim and tread plates engaging said studs, and means for attaching the sections of said metal bands to the rim plate and tread plate respectively.

FREDERIC I. JOHNSON.

Witnesses:
PENELOPE COMBERBACH,
NELLIE WHALEN.

Copies of this patent may be obtained for five cents each, by addressing the "Commissioner of Patents, Washington, D. C."